(12) United States Patent
Williams et al.

(10) Patent No.: US 7,715,817 B2
(45) Date of Patent: *May 11, 2010

(54) METHODS AND SYSTEMS FOR PROVIDING WIRELESS COMMUNICATIONS THROUGH A UTILITY POLE MOUNTED ANTENNA

(75) Inventors: Kenneth Williams, Kennesaw, GA (US); Pablo Kelly Piquerez, Kennesaw, GA (US)

(73) Assignee: Cox Communications, Inc., Atlanta, GA (US)

( * ) Notice: Subject to any disclaimer, the term of this patent is extended or adjusted under 35 U.S.C. 154(b) by 1036 days.

This patent is subject to a terminal disclaimer.

(21) Appl. No.: 11/407,648

(22) Filed: Apr. 20, 2006

(65) Prior Publication Data

US 2007/0249318 A1   Oct. 25, 2007

(51) Int. Cl.
*H04M 9/00* (2006.01)

(52) U.S. Cl. ........................ 455/402; 455/561

(58) Field of Classification Search ............... None
See application file for complete search history.

(56) References Cited

U.S. PATENT DOCUMENTS

| | | | |
|---|---|---|---|
| 5,937,348 A | 8/1999 | Cina et al. | 455/421 |
| 6,014,546 A | 1/2000 | Georges et al. | 725/79 |
| 6,366,584 B1 | 4/2002 | Gulliford et al. | 370/403 |
| 6,411,825 B1* | 6/2002 | Csapo et al. | 455/561 |
| 6,895,218 B2 | 5/2005 | Yarkosky | 455/20 |
| 7,013,145 B1 | 3/2006 | Centore, III | 455/454 |
| 7,123,649 B1 | 10/2006 | Smith et al. | 375/222 |
| 7,394,439 B1 | 7/2008 | Johnson et al. | 343/890 |
| 7,400,903 B2 | 7/2008 | Shoemake et al. | 455/552.1 |
| 2001/0010689 A1 | 8/2001 | Awater et al. | 370/344 |
| 2001/0051503 A1 | 12/2001 | Lush | 455/2.01 |
| 2002/0107809 A1 | 8/2002 | Biddle et al. | 705/59 |
| 2003/0054763 A1 | 3/2003 | Judd et al. | 455/20 |
| 2004/0212503 A1 | 10/2004 | Stilp | 340/572.1 |
| 2004/0259555 A1 | 12/2004 | Rappaport et al. | 455/446 |
| 2006/0025149 A1 | 2/2006 | Karaoguz et al. | 455/452.2 |
| 2006/0148482 A1 | 7/2006 | Mangold | 455/450 |
| 2006/0221889 A1* | 10/2006 | Murdock et al. | 370/328 |
| 2006/0234766 A1 | 10/2006 | Gillin et al. | |

(Continued)

OTHER PUBLICATIONS

U.S. Office Action dated May 6, 2009 cited in U.S. Appl. No. 11/507,215.

(Continued)

*Primary Examiner*—Erika A Gary
(74) *Attorney, Agent, or Firm*—Merchant & Gould

(57) ABSTRACT

Systems and methods are disclosed for providing wireless communications through, for example, a utility pole mounted antenna. The disclosed systems and methods may include receiving first data from a wire line network at a transceiver placed at a location on the wire line network. The location may be a place where the wire line network is present, where electrical power for the transceiver is present, or where a service provider of the wireless communications has a legal right to locate the transceiver. Furthermore, the disclosed systems and methods may include transmitting the first data wirelessly from the transceiver through an antenna wherein the transceiver and the antenna are located on a utility pole. Moreover, the disclosed systems and methods may include receiving second data at the transceiver wirelessly from a wireless device.

28 Claims, 4 Drawing Sheets

U.S. PATENT DOCUMENTS

| | | |
|---|---|---|
| 2006/0281468 A1 | 12/2006 | Gillin et al. |
| 2007/0069901 A1 | 3/2007 | Tuck et al. ............... 340/573.1 |
| 2007/0155325 A1 | 7/2007 | Bambic et al. ............. 455/41.2 |
| 2007/0249317 A1 | 10/2007 | Williams et al. |
| 2009/0103509 A1 | 4/2009 | Sanderford et al. ......... 370/343 |

OTHER PUBLICATIONS

Copending U.S. Appl. No. 11/407,641 filed Apr. 20, 2006, entitled "Methods and Systems for Providing Wireless Network Communications".

U.S. Final Office Action dated Mar. 19, 2009 cited in U.S. Appl. No. 11/237,108.

U.S. Office Action dated Sep. 17, 2008 cited in U.S. Appl. No. 11/237,108.

U.S. Final Office Action dated Nov. 18, 2009 cited in U.S. Appl. No. 11/507,215 (60136.0025usi1).

U.S. Office Action dated Jul. 24, 2009 cited in U.S. Appl. No. 11/407,641.

U.S. Office Action dated Sep. 29, 2009 cited in U.S. Appl. No. 11/237,108.

* cited by examiner

METHODS AND SYSTEMS FOR PROVIDING WIRELESS COMMUNICATIONS THROUGH A UTILITY POLE MOUNTED ANTENNA

RELATED APPLICATION

Related U.S. patent application Ser. No. 11/407,641, filed on even date herewith in the name of Kenneth Williams et al. and entitled "METHODS AND SYSTEMS FOR PROVIDING WIRELESS NETWORK COMMUNICATIONS," assigned to the assignee of the present application, is hereby incorporated by reference.

BACKGROUND

I. Field of the Invention

The present invention generally relates to methods and systems for providing wireless communications. More particularly, the present invention relates to providing wireless communications through, for example, a utility pole mounted antenna.

II. Background Information

Wireless is a term used to describe radio transmissions via the airwaves. Wireless is a very generic term that may refer to numerous forms of non-wired transmission, including amplitude modulation (AM), frequency modulation (FM) radio, television (TV), cellular telephones, portable telephones, and wireless local area networks (LANs). Various techniques are used to provide wireless transmission, including infrared line of sight, cellular, microwave, satellite, packet radio, and spread spectrum. In some situations, in order to provide wireless communications, service providers must build large transceiver towers such as cellular telephone towers for example. Thus, the conventional strategy is for the service provider to invest large amounts of time and money to construct large transceiver towers. This often causes problems because the conventional strategy may be cost prohibitive or may not result in placing a tower in a needed location due to government regulations or due to land not being available at the needed location.

In view of the foregoing, there is a need for methods and systems for providing wireless communications more optimally. Furthermore, there is a need for providing wireless communications through, for example, a utility pole mounted antenna.

SUMMARY

Consistent with embodiments of the present invention, systems and methods are disclosed for providing wireless communications through, for example, a utility pole mounted antenna.

In accordance with one embodiment, a method for providing wireless communications, the method comprising receiving first data from a wire line network at a transceiver placed at a location on the wire line network, the location comprising a place where the wire line network is present, where electrical power for the transceiver is present, and where a service provider of the wireless communications has a legal right to locate the transceiver and transmitting the first data wirelessly from the transceiver through an antenna wherein the transceiver and the antenna are located on a utility pole.

According to another embodiment, a system for providing wireless communications, the system comprising a transceiver configured to be located on a utility pole, the transceiver operative to receive first data from a wire line network at a location on the wire line network, the location comprising a place where the wire line network is present, where electrical power for the transceiver is present, and where a service provider of the wireless communications has a legal right to locate the transceiver and to transmit the first data wirelessly from the transceiver through an antenna configured to be located on the utility pole.

It is to be understood that both the foregoing general description and the following detailed description are exemplary and explanatory only, and should not be considered restrictive of the scope of the invention, as described and claimed. Further, features and/or variations may be provided in addition to those set forth herein. For example, embodiments of the invention may be directed to various combinations and sub-combinations of the features described in the detailed description.

BRIEF DESCRIPTION OF THE DRAWINGS

The accompanying drawings, which are incorporated in and constitute a part of this disclosure, illustrate various embodiments and aspects of the present invention. In the drawings.

DETAILED DESCRIPTION

Figure 1:
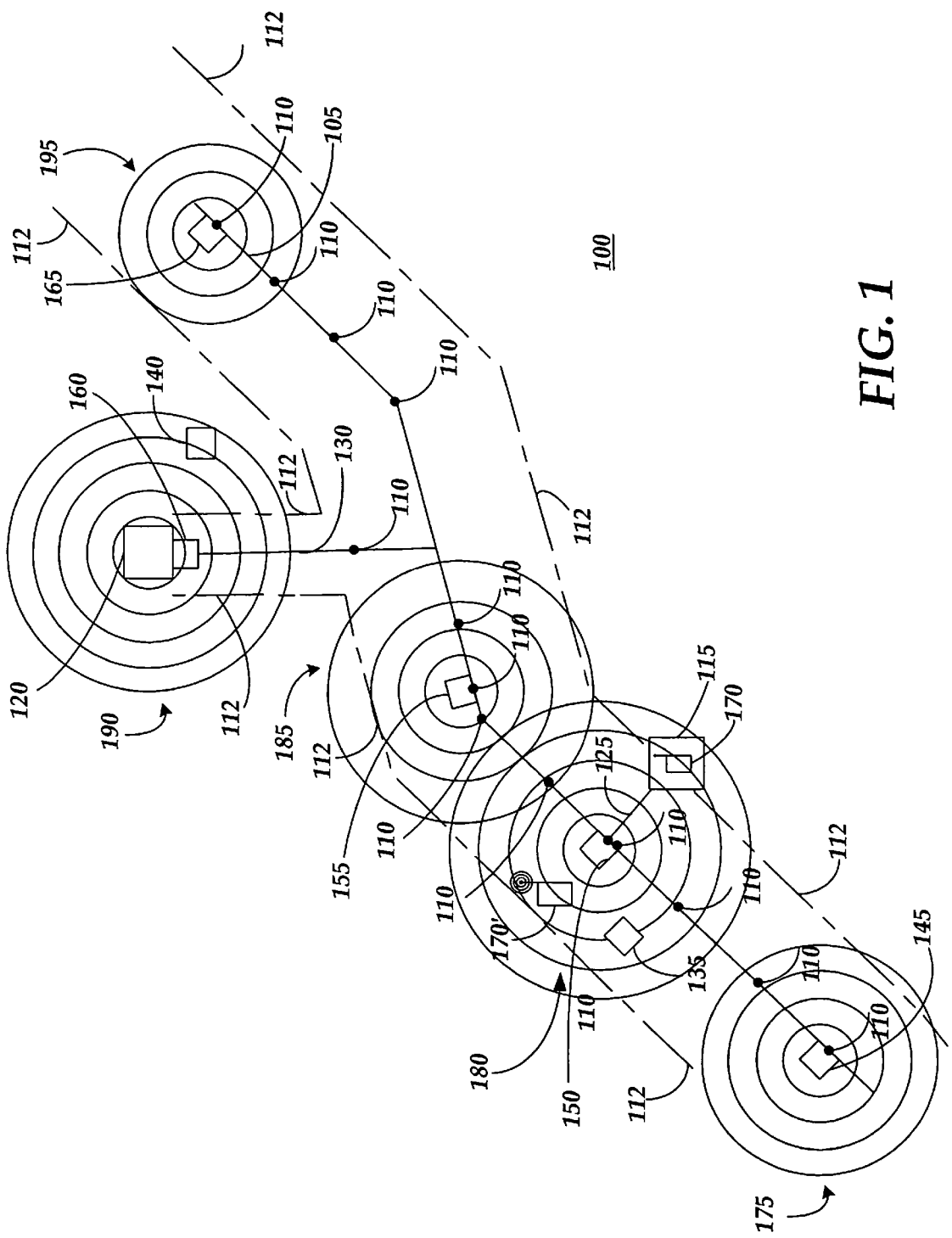
FIG. 1 is a block diagram of an exemplary wireless communications providing system consistent with an embodiment of the present invention.

The following detailed description refers to the accompanying drawings. Wherever possible, the same reference numbers are used in the drawings and the following description to refer to the same or similar parts. While several exemplary embodiments and features of the invention are described herein, modifications, adaptations and other implementations are possible, without departing from the spirit and scope of the invention. For example, substitutions, additions or modifications may be made to the components illustrated in the drawings, and the exemplary methods described herein may be modified by substituting, reordering or adding stages to the disclosed methods. Accordingly, the following detailed description does not limit the invention. Instead, the proper scope of the invention is defined by the appended claims.

Systems and methods consistent with embodiments of the present invention provide wireless communications through, for example, a utility pole mounted antenna. Consistent with embodiments of the present invention, instead of building a cell tower, for example, a service provider may contact a local utility (e.g. a electric utility) in order to construct a "mini tower". For example, the service provider may have a wire line network attached to a utility pole owned by the electric utility. The service provider may offer to pay the expenses for converting the utility pole to, for example, a hollow metal pole. The service provider may then place an antenna (above a high-voltage electric line) on the hollow metal pole's top. Furthermore, the service provider may run a cable from a transceiver to the antenna, the transceiver and the wire line network mounted on the hollow metal pole below the high-voltage electric line. The cable may run substantially vertically through the hollow metal utility pole's interior to the antenna. The antenna may not comprise a big array of antenna, but rather may comprise a few flat panels. In this way, an unobtrusive mini tower may be constructed in a location where power and the wire line network are located without having to purchase land, get a Federal Aviation Administration (FAA) clearance, or get public approval.

Consistent with embodiments of the invention, wired broadband networks, such as coaxial cable television networks, are pervasive, passing most homes and businesses in the communities server by a service provider. Such networks may be located, for example, in public or private utility rights-of-way. In addition, such networks may have a network wide data service enabled throughout all markets, comprising, for example, data over cable service interface specification (DOCSIS) high speed data service. Furthermore, such networks may have electric power available, for example, on or near the coaxial network.

Combining the advantage of access via the right-of-way, pervasive network power, and a ubiquitous data service, transceivers may be placed on the network that may enable, for example, construction of a mini tower. The transceivers may combine, for example, a cable modem and a wireless access point radio in an environmentally hardened enclosure and be energized by the coaxial network power. Because the transceivers may be located in a utility right-of-way, the service provider may not have to obtain permission to install the transceivers (even at a customer premises) or share revenue with another enterprise.

An embodiment consistent with the invention may comprise a system for providing wireless communications. The system may comprise a transceiver configured to be located on a utility pole. The transceiver may be operative to receive first data from a wire line network at a location on the wire line network. The location may comprise a place where the wire line network is present, a place where electrical power for the transceiver is present, or a place where a service provider of the wireless communications has a legal right to locate the transceiver. Moreover, the transceiver may be operative to transmit the first data wirelessly from the transceiver through an antenna configured to be located on the utility pole.

Another embodiment consistent with the invention may comprise a system for providing wireless network communications. The system may comprise a memory storage for maintaining a database and a processing unit coupled to the memory storage. The processing unit may be operative to receive first data from a wire line network at a location on the wire line network. The location may comprise a place where the wire line network is present, a place where electrical power for the transceiver is present, or a place where a service provider of the wireless communications has a legal right to locate the transceiver. Moreover, the processing unit may be operative to transmit the first data wirelessly from the processing unit through an antenna configured to be located on the utility pole.

Consistent with an embodiment of the present invention, the aforementioned transceiver, memory, processing unit, and other components may be implemented in a wireless communications providing system, such as an exemplary wireless network communications providing system 100 of FIG. 1. Any suitable combination of hardware, software, and/or firmware may be used to implement the transceiver, memory, processing unit, or other components. By way of example, the memory, processing unit, or other components may be implemented with any of transceivers 145, 150, 155, 160, and 165, in combination with system 100. The aforementioned system and processors are exemplary and other systems and processors may comprise the aforementioned transceiver, memory, processing unit, or other components, consistent with embodiments of the present invention.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. The invention may also be practiced using other technologies capable of performing logical operations such as, for example, AND, OR, and NOT, including but not limited to mechanical, optical, fluidic, and quantum technologies. In addition, the invention may be practiced within a general purpose computer or in any other circuits or systems.

By way of a non-limiting example, FIG. 1 illustrates system 100 in which the features and principles of the present invention may be implemented. As illustrated in the block diagram of FIG. 1, system 100 may include a wire line network 105 placed, for example, on utility poles 110. In one embodiment, wire line network 105 may comprise an overhead cable television line placed on poles by itself or along with facilities belonging to other utilities. Utility poles 110 may be owned by a service provider who owns wire line network 105 or by another enterprise such as an electric or telecommunications utility company. Alternately, wire line network 105 may comprise an underground line place, for example, in a ditch by itself or including facilities belonging to other utilities. Wire line network 105 and utility poles 110 may be placed within a utility right-of-way with boundaries 112. Wire line network 105, for example, may comprise, but is not limited to, any one or more of a coaxial cable network, a hybrid fiber-coax (HFC) network, a fiber optic network, or a twister pair network. Furthermore, wire line network may use any one or more of asynchronous transfer mode (ATM), a synchronous optical network (SONET) transmission system, Ethernet, and DOCSIS. The aforementioned are exemplary, and wire line network 105 may comprise any type of network using any type of protocol.

Ethernet is a widely used local area network (LAN) access method, defined by the IEEE as the 802.3 standard. DOCSIS is a set of standards for transferring data via cable TV and cable modems. SONET is a fiber-optic transmission system for high-speed digital traffic employed by telephone companies and common carriers with speeds range from 51 Mbps to 40 Gbps. ATM is a network technology for both LANs and wide area networks (WANs) that supports realtime voice and video as well as data. The ATM topology uses switches that establish a logical circuit from end-to-end, that may guarantee quality of service (QoS).

Wire line network 105 may be pervasive throughout a community. For example, wire line network may run through a certain geographic area and be capable of serving nearly all homes, businesses, or other enterprises within the community with any type wire line services. For example, wire line network 105 may comprise a cable television coaxial network capable of reaching all or nearly all homes, businesses, or other enterprises within the community.

Wire line network 105 may serve first end use location 115 and second end use location 120 with wire service drops 125 and 130 respectively. End use location 135 and 140 may be close enough to be serviced by wire line network 105, but no wire service drop has yet been extended to either of these end use locations. For example, users at these locations my not have ordered wired service yet from the service provider operating wire line network 105.

As stated above, system 100 may also include transceivers 145, 150, 155, 160, and 165. Any of these transceivers may be operative to receive first data from wire line network 105 a location on wire line network 105. Any of transceivers 145, 150, 155, 160, and 165 may be placed at a location comprising a place where wire line network 105 is present, where electrical power for the respective transceiver is present, and where the service provider of the wireless network communications has a legal right to locate the transceiver. Each of transceivers 145, 150, 155, 160, and 165 may include a respective range 175, 180, 185, 190, and 195 in which each transceiver can transmit and receive data. The ranges for transceivers 145, 150, 155, 169, and 165 may or may not overlap. For example, because a wireless device 170 is within range 180 corresponding to transceiver 150, transceiver 150 may transmit the first data wirelessly to wireless device 170. Likewise, transceiver 150 may receive second data wirelessly from wireless device 170. Each of transceivers 145, 150, 155, 160, and 165 may be operative to transmit and receive data wirelessly using, for example, one of Wi-Fi and Wi-Max. The aforementioned are exemplary, and other transmitting and receiving processes may be used.

Wireless device 170 need not be located in end use locations, but can be located outside end use location 115 (e.g. 170'.) Wireless device 170 may communicate with any of transceivers 145, 150, 155, 160, and 165 as long as it is within any one or more of ranges 175, 180, 185, 190, and 195. Wireless device 170 may comprise, but is not limited to, a cellular telephone, a computer, a two-way radio, and a device capable of receiving packetized data. The aforementioned are exemplary and wireless device 170 may comprise other devices. Furthermore, the first data and/or the second data may comprise one of cellular telephone traffic transported by wire line network 105, two-way radio traffic transported by wire line network 105, and packetized data.

Any of transceivers 145, 150, 155, 160, and 165 may comprise a combined radio and cable modem configured to operate in an outdoor environment. For example, any of the transceivers may be configured to operate in direct sunlight, in rain, in extremely low and extremely high temperatures. The electrical power for any of transceivers 145, 150, 155, 160, and 165 may be provided from wire line network 105 or from other electrical power sources. Any of transceivers 145, 150, 155, 160, and 165 may be located within a utility right-of-way, on a utility pole, at a utility service termination point, out-of-doors, or less than 1000 feet from any wireless device. The aforementioned are exemplary, and any of transceivers 145, 150, 155, 160, and 165 may be located: i) where wire line network 105 is present; ii) where electrical power for transceiver 150 is present; and iii) where the service provider of the wireless network communications has a legal right to locate the transceiver. The legal right to locate any of transceivers 145, 150, 155, 160, and 165 may comprise one of a right-of-way easement and a right-of-way joint use agreement with an enterprise having a right to locate facilities at the location. For example, utility right-of-way with boundaries 112 may indicate an area in which the service provider of the wireless network communications has a legal right to locate any of transceivers 145, 150, 155, 160, and 165. The aforementioned are exemplary, and the legal right to locate any of transceivers 145, 150, 155, 160, and 165 may comprise any interest in real property.

Figure 2A:
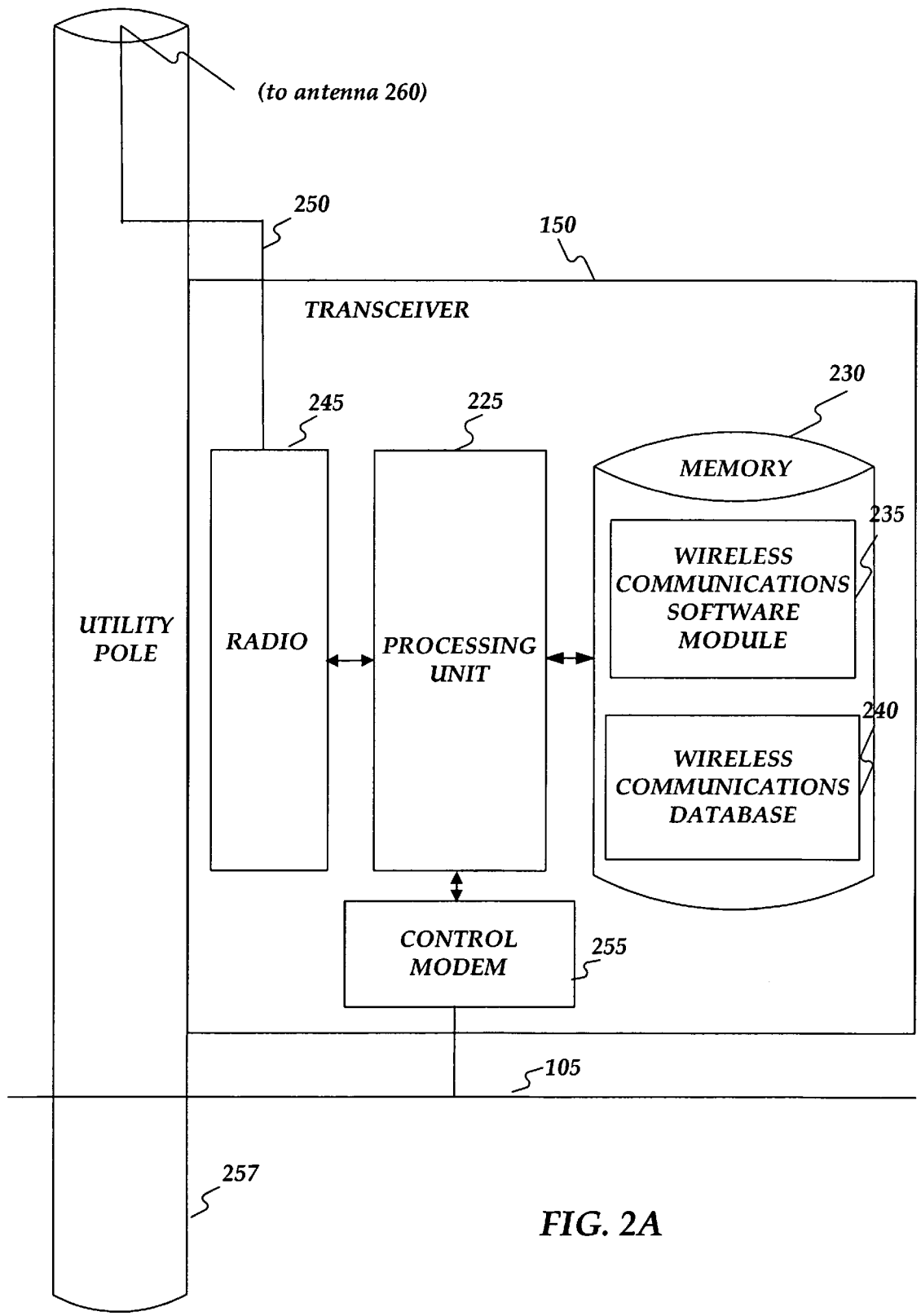
FIGS. 2A and 2B illustrate an exemplary utility pole mounted transceiver and antenna consistent with an embodiment of the present invention.

FIG. 2A shows transceiver 150 of FIG. 1 in more detail. Transceivers 145, 155, 160, and 165 may comprise a similar structure. As shown in FIG. 2A, transceiver 150 may include a processing unit 225 and a memory 230. Memory 230 may include a wireless communications software module 235 and a wireless communications database 240. A radio 245 may communicate with processing unit 225 and send and receive data through antenna 260. Transceiver 150 may connect to antenna 260 through cable 250. Transceiver 150 may connect to wire line 105 using modem 255. While executing on processing unit 225, wireless communications software module 235 may perform processes for providing wireless communications, including, for example, one or more of the stages of method 300 described below with respect to FIG. 3. Alternatively, the function of processing unit 225 and memory 230 may be practiced, for example, in an electrical circuit comprising discrete electronic elements, packaged or integrated electronic chips containing logic gates, a circuit utilizing a microprocessor, or on a single chip containing electronic elements or microprocessors.

Figure 2B:
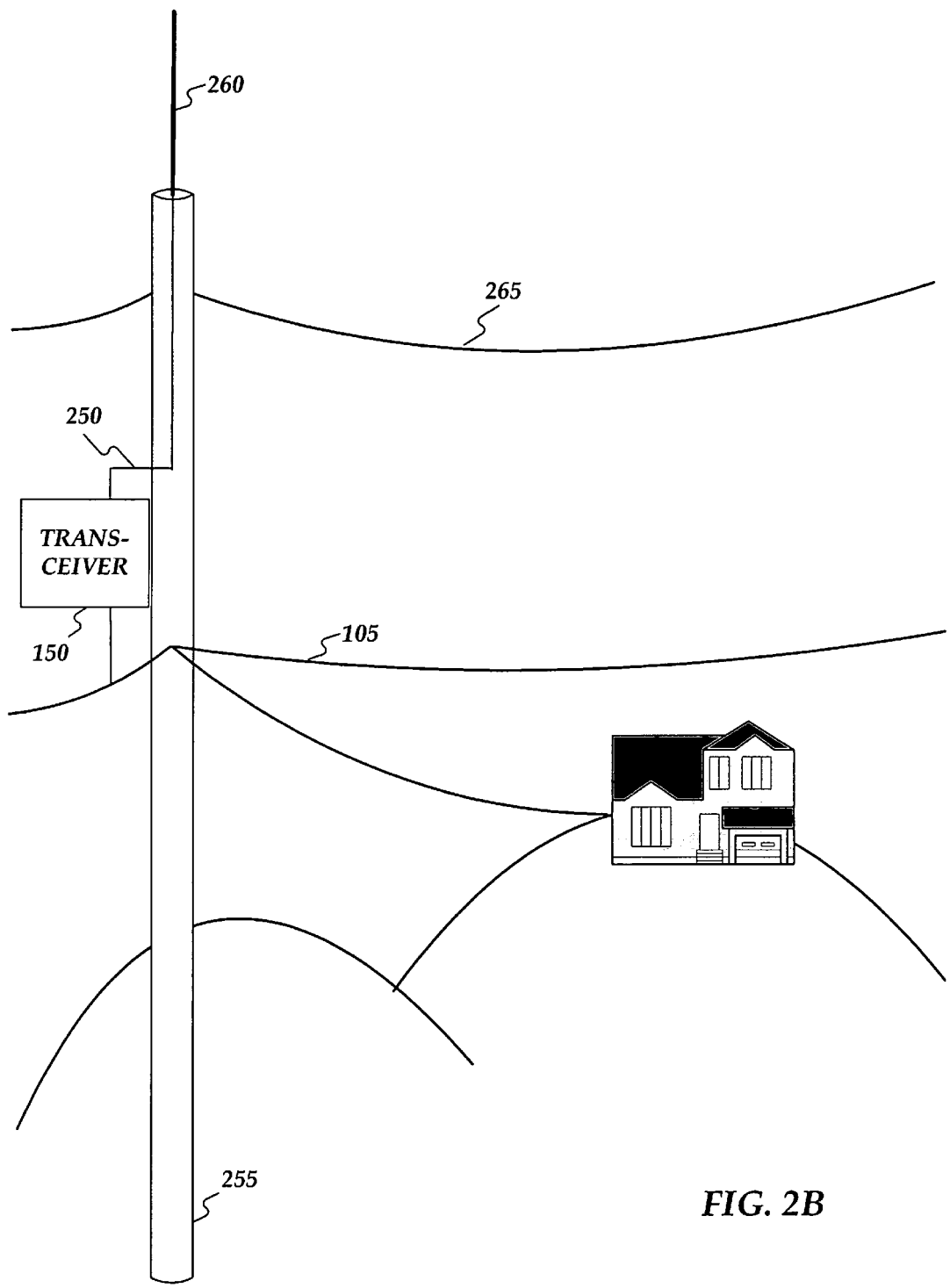

FIG. 2B shows a potion of cable 250 passing substantially vertically through an interior of a utility pole 257. Transceiver 150 may mount to the side of utility pole 257 and antenna 260 may mount near or on the top of utility pole 257. Utility pole 257 may be metal, hollow, and may be hermetically sealed. The aforementioned are exemplary and utility pole 257 may include other features and configurations. Transceiver 150 and wire line network 105 may be mounted on utility pole 257 below a high-voltage power line 265. Antenna 260 may be mounted above high-voltage power line 265. Moreover, utility pole 257 may comprise any type of vertical structure and is not limited to a pole owned by any type enterprise. Furthermore, high-voltage power line 265 may provide power to any of transceivers 145, 150, 155, 160, and 165, through, for example, a transformer (not shown).

Any of transceivers 145, 150, 155, 160, and 165 ("the transceivers") included in system 100 may be implemented using a personal computer, network computer, mainframe, or other similar microcomputer-based workstation. The transceivers may though comprise any type of computer operating environment, such as hand-held devices, multiprocessor systems, microprocessor-based or programmable sender electronic devices, minicomputers, mainframe computers, and the like. The transceivers may also be practiced in distributed computing environments where tasks are performed by remote processing devices. Furthermore, any of the transceivers may comprise a mobile terminal, such as a smart phone, a cellular telephone, a cellular telephone utilizing wireless application protocol (WAP), personal digital assistant (PDA), intelligent pager, portable computer, a hand held computer, a conventional telephone, or a facsimile machine. The aforementioned systems and devices are exemplary and the transceiver may comprise other systems or devices.

Figure 3:
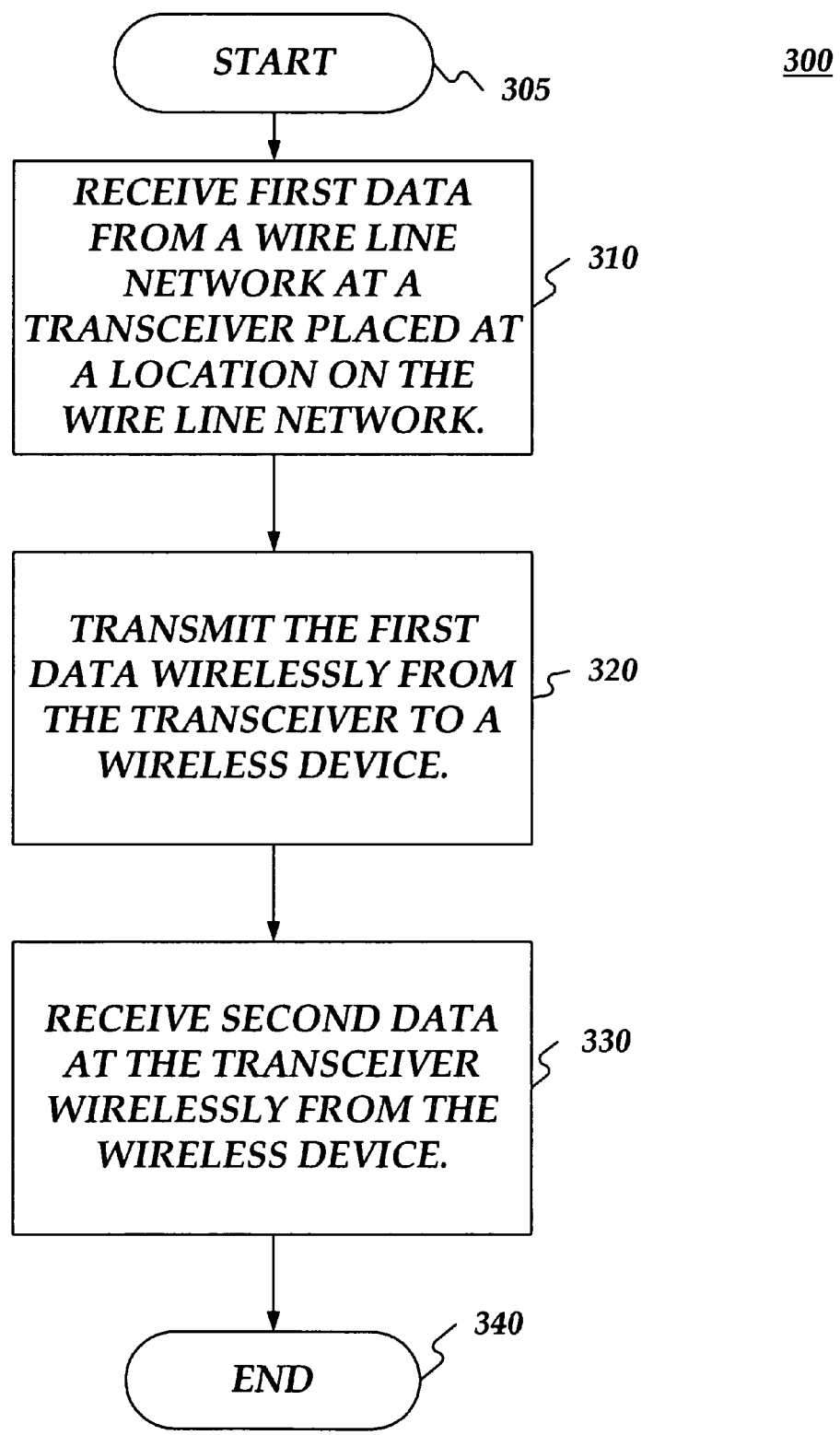
FIG. 3 is a flow chart of an exemplary method for providing wireless communications consistent with an embodiment of the present invention.

FIG. 3 is a flow chart setting forth the general stages involved in an exemplary method 300 consistent with the invention for providing wireless network communications using system 100 of FIG. 1. Exemplary ways to implement the stages of exemplary method 300 will be described in greater detail below. Exemplary method 300 may begin at starting block 305 and proceed to stage 310 where transceiver 150 may receive first data from wire line network 105. Transceiver 150 may be placed at a location on wire line network 105 comprising a place: i) where wire line network 105 is present; ii) where electrical power for transceiver 150 is present; and iii) where a service provider of the wireless network communications has a legal right to locate transceiver 150. For example, wire line network 105 may comprise a wired broadband network, such as a coaxial cable television network. The cable television network may be pervasive, passing most homes and businesses in the communities server by the service provider. Moreover, the cable television network may be located, for example, in a public or private utility right-of-way. In addition, the cable television network may have a network wide data service enabled throughout all markets, comprising, for example, DOCSIS high speed data service. Also, the cable television network may have electric power available, for example, on the coaxial network.

Combining the advantage of access via the right-of-way, pervasive network power, and a ubiquitous data service, transceiver 150 may be placed on wire line network 105 that may enable, for example, cellular telephone traffic transportation or wireless fidelity (Wi-Fi) service on the fly in any part of wire line network 105. Transceiver 150 may combine, for example, a cable modem and a wireless access point radio in an environmentally hardened enclosure and be energize by wire line network 105 or another power source at transceiver 150's location. Because transceiver 150 may be located in a utility right-of-way, the service provider may not have to obtain permission to install transceiver 150 (even at a customer premises) or share revenue with another enterprise. The service provider branded wireless service could be enabled in almost any location along wireline network 105.

From stage 310, where transceiver 150 receives first data from wire line network 105, exemplary method 300 may advance to stage 320 where transceiver 150 may transmit the first data wirelessly from transceiver 150 to wireless device 170. For example, the first data may comprise a web page or e-mail directed to an internet protocol (IP) address associated with wireless device 170. The first data may be routed over the internet, for example, through wire line network 105, to transceiver 150. Furthermore, the first data may comprise cellular telephone traffic transported by wire line network 105 to wireless device 170. Transceiver 150 may receive the first data through modem 255. Then transceiver 150 may transmit the first data using radio 245. In transmitting the first data, transceiver 150 may use, for example, Wi-Fi or cellular telephone processes and protocols. The aforementioned are exemplary and others may be used.

Once transceiver 150 transmits the first data wirelessly to wireless device 170 in stage 320, exemplary method 300 may continue to stage 330 where transceiver 150 may receive second data at transceiver 150 wirelessly from wireless device 170. For example, the second data may comprise information returned in response the aforementioned web page or an e-mail directed from the IP address associated with wireless device 170. Furthermore, the second data may comprise cellular telephone traffic from wireless device 170 to be transported back through wire line network 105. After transceiver 150 receives second data in stage 330, exemplary method 300 may then end at stage 340.

The present invention may be embodied as systems, methods, and/or computer program products. Accordingly, the present invention may be embodied in hardware and/or in software (including firmware, resident software, micro-code, etc.). Furthermore, embodiments of the present invention may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present invention are described above with reference to block diagrams and/or operational illustrations of methods, systems, and computer program products according to embodiments of the invention. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved.

While certain features and embodiments of the invention have been described, other embodiments of the invention may exist. Furthermore, although embodiments of the present invention have been described as being associated with data stored in memory and other storage mediums, aspects can also be stored on or read from other types of computer-readable media, such as secondary storage devices, like hard disks, floppy disks, or a CD-ROM, a carrier wave from the Internet, or other forms of RAM or ROM. Further, the steps of the disclosed methods may be modified in any manner, including by reordering steps and/or inserting or deleting steps, without departing from the principles of the invention.

It is intended, therefore, that the specification and examples be considered as exemplary only, with a true scope and spirit of the invention being indicated by the following claims and their full scope of equivalents.

What is claimed is:

1. A method for providing wireless communications, the method comprising:

identifying an electric utility distribution pole, the electric utility distribution pole having had previously attached to it an overhead electric line configured to supply electrical power and the electric utility distribution pole having had previously attached to it an overhead network line corresponding to a wire line network, the electric utility distribution pole comprising one of a plurality of electric utility distribution poles being configured to support the overhead electric line and being configured to support the overhead network line comprising a cable television line;

placing, by a service provider owning the overhead network line, a transceiver on the identified electric utility distribution pole, the service provider owning the overhead network line having a legal right to place the transceiver on the identified electric utility distribution pole, the service provider owning the overhead network line comprising a service provider providing data service corresponding to the data over cable service interface specification (DOCSIS) over the wire line network;

connecting the transceiver to the overhead electric line to supply electrical rower to the transceiver;

connecting the transceiver to the overhead network line configured to place the transceiver on the wire line network;

receiving first data from the wire line network at the transceiver; and transmitting the first data wirelessly from the transceiver through an antenna wherein the transceiver and the antenna are located on the identified electric utility distribution pole.

2. The method of claim 1, wherein receiving the first data from the wire line network further comprises receiving the first data from the wire line network being pervasive throughout a community.

3. The method of claim 1, wherein receiving the first data from the wire line network comprises receiving the first data comprising packetized data.

4. The method of claim 1, wherein receiving the first data from the wire line network at the transceiver further comprises receiving the first data from the wire line network at the transceiver comprising a combined radio and cable modem configured to operate in an outdoor environment.

5. The method of claim 1, wherein receiving the first data from the wire line network at the transceiver comprises receiving the first data from the wire line network at the transceiver located on the side of the identified electric utility distribution pole.

6. The method of claim 1, wherein transmitting the first data wirelessly from the transceiver through the antenna comprises transmitting the first data wirelessly from the transceiver through the antenna located approximately on a top of the identified electric utility distribution pole.

7. The method of claim 1, wherein transmitting the first data wirelessly from the transceiver through the antenna comprises transmitting the first data wirelessly from the transceiver through the antenna wherein a signal including the first data is transmitted from the transceiver to the antenna over a cable, a portion of the cable passing substantially vertically through an interior of the identified electric utility distribution pole.

8. The method of claim 1, wherein transmitting the first data wirelessly from the transceiver through the antenna wherein the transceiver and the antenna are located on the identified electric utility distribution pole comprises transmitting the first data wirelessly from the transceiver through the antenna wherein the transceiver and the antenna are located on identified electric utility distribution pole being at least one of the following: hollow and made of metal.

9. The method of claim 1, wherein transmitting the first data wirelessly further comprises transmitting the first data wirelessly using at least one of the following: Wi-Fi and Wi-Max.

10. The method of claim 1, wherein transmitting the first data wirelessly comprises transmitting the first data wirelessly to a wireless device.

11. The method of claim 10, wherein transmitting the first data wirelessly from the transceiver to the wireless device comprises transmitting the first data wirelessly from the transceiver to the wireless device comprising one of the following: a cellular telephone; a computer; a two-way radio; and a device capable of receiving packetized data.

12. The method of claim 1, further comprising receiving second data at the transceiver wirelessly.

13. The method of claim 12, wherein receiving the second data at the transceiver wirelessly comprises receiving the second data at the transceiver wirelessly from a wireless device.

14. The method of claim 1, wherein placing the transceiver on the identified electric utility distribution pole by the service provider owning the overhead network line and having the legal right to place the transceiver on the identified electric utility distribution pole comprises placing the transceiver wherein the legal right comprises a right-of-way easement.

15. The method of claim 1, wherein placing the transceiver on the identified electric utility distribution pole by the service provider owning the overhead network line and having the legal right to place the transceiver on the identified electric utility distribution pole comprises placing the transceiver wherein the legal right comprises a joint use agreement between the service provider owning the overhead network line and a service provider owning the plurality of electric utility distribution poles.

16. A system for providing wireless communications, the system comprising a transceiver operative to:

receive first data corresponding to the data over cable service interface specification (DOCSIS) from a wire line network at a location on the wire line network, the location comprising an electric utility distribution pole, the electric utility distribution pole having had previously attached to it an overhead electric line configured to supply electrical power and the electric utility distribution pole having had previously attached to it an overhead network line corresponding to a wire line network, the electric utility distribution pole comprising one of a plurality of electric utility distribution poles being configured to support the overhead electric line and being configured to support the overhead network line comprising a cable television line, the transceiver having been placed at the location by a service provider owning the overhead network line having a legal right to place the transceiver at the location, the service provider owning the overhead network line providing data service corresponding to the data over cable service interface specification (DOCSIS) over the wire line network, the transceiver being connected to the overhead electric line to supply electrical power to the transceiver and the transceiver being connected to the overhead network line configured to place the transceiver on the wire line network; and transmit the first data wirelessly from the transceiver through an antenna configured to be located on the identified electric utility distribution pole.

17. The system of claim 16, wherein the wire line network is pervasive throughout a community.

18. The system of claim 16, wherein the first data comprises packetized data.

19. The system of claim 16, wherein the transceiver comprises a combined radio and cable modem configured to operate in an outdoor environment.

20. The system of claim 16, wherein the transceiver is configured to be mounted on the side of the identified electric utility distribution pole.

21. The system of claim 16, wherein the antenna is configured to be mounted approximately on a top of the identified electric utility distribution pole.

22. The system of claim 16, wherein a signal including the first data is transmitted from the transceiver to the antenna over a cable, a portion of the cable passing substantially vertically through an interior of the identified electric utility distribution pole.

23. The system of claim 16, wherein the identified electric utility distribution pole comprises at least one of the following: is hollow and made of metal.

24. The system of claim 16, wherein the transceiver being operative to transmit the first data wirelessly comprises the transceiver being operative to transmit the first data wirelessly using one of the following: Wi-Fi and Wi-Max.

25. The system of claim 16, wherein the transceiver being operative to transmit the first data wirelessly comprises the transceiver being operative to transmit the first data wirelessly to a wireless device.

26. The system of claim 25, wherein the wireless device comprises one of the following: a cellular telephone; a computer; a two-way radio; and a device capable of receiving packetized data.

27. The system of claim 16, further comprising the transceiver being operative to receive second data at the transceiver wirelessly.

28. The system of claim 16, further comprising the transceiver being operative to receive second data at the transceiver wirelessly from a wireless device.

* * * * *